United States Patent
Craft et al.

(10) Patent No.: US 7,248,696 B2
(45) Date of Patent: Jul. 24, 2007

(54) DYNAMIC SYSTEM BUS ENCRYPTION USING IMPROVED DIFFERENTIAL TRANSITIONAL ENCODING

(75) Inventors: David John Craft, Austin, TX (US); Charles Ray Johns, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 844 days.

(21) Appl. No.: 10/242,525

(22) Filed: Sep. 12, 2002

(65) Prior Publication Data
US 2004/0052375 A1   Mar. 18, 2004

(51) Int. Cl.
*H04L 9/00*   (2006.01)
*H04K 1/00*   (2006.01)

(52) U.S. Cl. .......................... 380/263; 380/46; 380/268

(58) Field of Classification Search ..................... None
See application file for complete search history.

(56) References Cited

U.S. PATENT DOCUMENTS

| | | | |
|---|---|---|---|
| 3,697,768 A | 10/1972 | Johnston | |
| 4,667,337 A | 5/1987 | Fletcher | |
| 4,905,176 A * | 2/1990 | Schulz | 708/252 |
| 5,025,256 A | 6/1991 | Stevens | |
| 5,142,167 A | 8/1992 | Temple et al. | |
| 5,285,477 A * | 2/1994 | Leonowich | 375/257 |
| 5,365,585 A * | 11/1994 | Puhl et al. | 380/265 |
| 5,369,640 A | 11/1994 | Watson et al. | |
| 5,404,402 A * | 4/1995 | Sprunk | 713/189 |
| 5,574,475 A | 11/1996 | Callahan et al. | |
| 5,586,046 A | 12/1996 | Feldbaumer et al. | |
| 5,890,005 A | 3/1999 | Lindholm | |
| 5,987,572 A * | 11/1999 | Weidner et al. | 711/155 |
| 6,275,884 B1 | 8/2001 | Craft et al. | |
| 6,304,933 B1 | 10/2001 | Craft | |
| 6,327,661 B1 * | 12/2001 | Kocher et al. | 713/193 |
| 6,489,900 B2 * | 12/2002 | Shin et al. | 341/50 |
| 6,502,135 B1 * | 12/2002 | Munger et al. | 709/225 |
| 6,553,445 B1 | 4/2003 | Drapkin et al. | |
| 6,665,161 B1 | 12/2003 | Brady et al. | |
| 6,721,918 B2 | 4/2004 | Self et al. | |

(Continued)

FOREIGN PATENT DOCUMENTS

JP   2001237825   8/2001

OTHER PUBLICATIONS

Kuhn, Markus G. Cipher Instruction Search Attack on the Bus-Encryption Security Microcontroller DS5002FP, IEEE Transactions on Computers vol. 47, No. 10. Oct. 1998.*

(Continued)

*Primary Examiner*—Christopher Revak
(74) *Attorney, Agent, or Firm*—Carr LLP; D'Ann N. Rifai

(57) ABSTRACT

The present invention provides data encryption for a differential bus employing transitional coding. The present invention maps, encodes and encrypts input data as a logic status for a given bus transfer cycle. The mapping, encoding and encrypting of the input data changes from bus transfer cycle to bus transfer cycle. The mapping, encoding and encrypting is a function of a pseudo-random number. A logic status is differentially transmitted from a bus transmitter to a bus receiver, to be mapped, decrypted and decoded as the corresponding output data.

20 Claims, 3 Drawing Sheets

U.S. PATENT DOCUMENTS

| | | | |
|---|---|---|---|
| 6,732,214 B1 | 5/2004 | Cohen et al. | |
| 6,826,616 B2* | 11/2004 | Larson et al. | 709/228 |
| 6,839,759 B2* | 1/2005 | Larson et al. | 709/228 |
| 6,839,847 B1* | 1/2005 | Ohki et al. | 713/194 |
| 6,892,940 B2* | 5/2005 | Kocarev et al. | 235/380 |
| 6,987,853 B2* | 1/2006 | Uner | 380/44 |
| 7,103,184 B2* | 9/2006 | Jian | 380/205 |
| 7,120,696 B1* | 10/2006 | Au et al. | 709/229 |
| 7,188,180 B2* | 3/2007 | Larson et al. | 709/227 |
| 2002/0169968 A1* | 11/2002 | Gammel et al. | 713/189 |
| 2003/0039357 A1* | 2/2003 | Alten | 380/46 |
| 2003/0048900 A1* | 3/2003 | Kim et al. | 380/229 |
| 2003/0099300 A1* | 5/2003 | Anders et al. | 375/259 |
| 2003/0177381 A1* | 9/2003 | Ofek et al. | 713/200 |
| 2003/0177391 A1* | 9/2003 | Ofek et al. | 713/201 |
| 2004/0039931 A1* | 2/2004 | Dabbous et al. | 713/194 |
| 2005/0232430 A1* | 10/2005 | Gebotys | 380/286 |

OTHER PUBLICATIONS

Newton, Harry. Newton's Telecom Dictionary 18th Edition. Feb. 2002.*

Craft, David J.; "Improved CMOS Core Interconnect Approach for Advanced SoC Application"; *Intellectual Property Conference*; 1999; IBM Microelectronics Division, Austin, Texas.

Craft, David J.; Pending U.S. Appl. No. 09/804,799; filed Mar. 14, 2001 entitled "Method and Apparatus for Adaptively Compensating Skews During Data Transmission on a Bus".

Ramprasad et al.; "Achievable Bounds On Signal Transition Activity"; IEEE/ACM International Conference on Computer-Aided Design; Nov. 1997; IEEE.

Benini et al.; "Address Bus Encoding Techniques for System-Level Power Optimization"; Design, Automation and Test in Europe; Feb. 1998; IEEE.

Sotiriadis et al.; "Bus Energy Minimization by Transition Pattern Coding (TPC) in Deep Sub-Micron Technologies"; IEEE/ACM International Conference on computer-Aided Design; Nov. 2000; IEEE.

Sundararajan et al.; "Reducing Bus Transition Activity by Limited Weight Coding with Codeword Slimming"; ACM Great Lakes Symposium on VLSI; Mar. 2000; ACM.

The SCSI Trade Association; "Ultra2 SCSI-The Evolution Continues"; The SCSI Trade Association; Nov. 1996.

The Digital Display Working Group Promoters; "Digital Visual Interface: DVI"; The Digital Display Working Group Promoters; Apr. 2, 1999; Revision 1.0; pp. 24-32.

"Single-Ended vs. Differential Inputs"; <htt;://www.omega.com/techref/das/se-differential.html>; 2001.

International Business Machines Corporation; "Hybrid Transitional Coding of Wide On-chip Busses"; Kenneth Mason Publications Ltd; Nov. 1001.

* cited by examiner

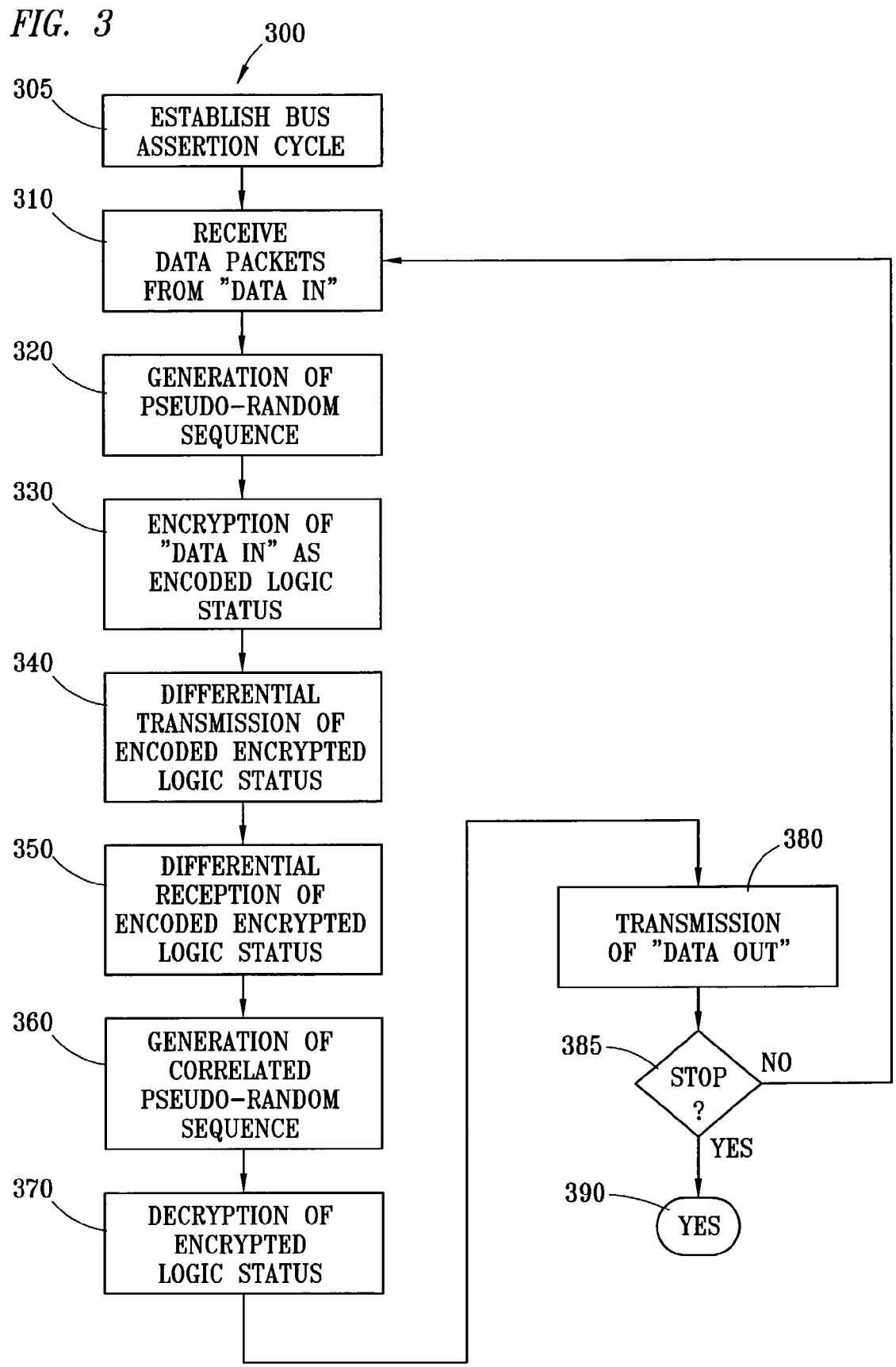

DYNAMIC SYSTEM BUS ENCRYPTION USING IMPROVED DIFFERENTIAL TRANSITIONAL ENCODING

CROSS-REFERENCED APPLICATION

This application cross-references U.S. Patent Application of David John Craft and Charles Ray Johns entitled "METHOD AND SYSTEM FOR AN IMPROVED DIFFERENTIAL FORM OF TRANSITIONAL CODING" Ser. No. 10/242,522, filed concurrently herewith.

TECHNICAL FIELD

The invention relates generally to a bus data transfer system and, more particularly, to a method and a system employing data encryption for a differential form of transitional coding.

BACKGROUND

The greatly increased circuit density and speeds available within today's microchips has in turn resulted in correspondingly enhanced on-chip functional capability and performance. However, these enhancements have themselves begun to raise certain other concerns, such as the performance of conventional data bus techniques. The much higher off-chip input and output bandwidths (that is, data transfers to and from the microchip), which are necessary to make effective use of such greatly enhanced on-chip functional capability, are becoming much more difficult to provide.

One solution to this dilemma is to employ a wider bus data path. However, the increased numbers of bus data driver circuits required by this approach cause further problems for the chip designer. Depending on how different the data pattern being transferred in a given bus cycle is from that of the preceding bus cycle, anywhere between all and none of the data bus drivers may be required to change the voltage levels of their respective data bus lines. Since each data bus line may have a significant load capacitance, there could both be a significant peak total driver current requirement (if all drivers simultaneously and rapidly attempt to change the voltage levels of their bus lines), and significant variations in such driver current demand from one bus cycle to the next (if all switch in one cycle, for example, and none switch in the next). It becomes increasingly difficult to provide adequate power distribution to large numbers of such driver circuits, as the inductance and resistance of the on-chip power supply and ground grids feeding them results in significant dynamic bus data-dependent voltage shifts. These in turn are often coupled as noise to other circuitry on the chip.

One approach to this problem is to use driver circuits designed to limit slew rates, that is, how fast they change the voltage on their associated data bus line loads. Another is to "stagger" the driver circuit operation, so they do not all attempt to change their associated data bus lines at precisely the same instant. These methods are both effective, but at the cost of a longer bus cycle time, and slower data transfer rates.

Another approach is to use differential transmission, in which two wires are used for each data bus bit line. A constant current is then diverted down one driver circuit path or another to produce the differential signal. This typically results in lower ground and supply grid transients on-chip at the driver, with improved noise immunity at the receiver chip, since only the difference between the two data bus bit line voltage levels is significant to the differential receiver. This in turn allows lower voltage signal level swings to be used on the bus lines, which then reduces on-chip driver current demand for a given capacitive bus loading. Coupled noise within the data bus lines is also reduced, as is emitted electromagnetic radiation. This technique is generally referred to as LVDS (Low Voltage Differential Signal levels), to distinguish it from the single-ended type of bus where one wire is used to transmit each data bit, and the voltage levels used are typically the same as the logic circuitry.

Generally, the latter technique is used at this time for bus connections within a chip, and either the single-ended or LVDS methods for transmission between chips, depending on the speeds required, and the distance/load capacitance presented by the data bus lines.

U.S. Pat. No. 6,304,933 teaches a further improvement to the single-ended technique, which is called "Transitional Coding". In this patent, data is transmitted through the activation or de-activation of one of four bus lines, each transition of one of the four bus lines representing a unique 2-bit binary value. The result is a reduced variation in driver current demand compared to a conventional single-ended approach, because two consecutive single-wire transitions are always required to transmit 4 bits of information, compared to anywhere from 0 to 4 simultaneous wire transitions over the same four wires if employed as part of a conventional single-ended data bus. In addition, the transitions are self-clocking, and can therefore be somewhat faster, especially in an on-chip environment.

Even using the LVDS technique, however, the numbers of driver circuits required for the increasingly wide bus data paths needed to supply adequate data transfer rates still present a significant on-chip simultaneous switching problem. The design of the bus system must allow for the possibility of each bus cycle transferring the inverse data pattern to that of the preceding one. All or none of the data lines might thus potentially be transitioned each cycle, and some of these might be differentially driven in the opposite sense to their adjacent neighbors, thereby increasing the effective inter-signal line load capacitance.

Variance in the number of switching bus lines resulting from such transitions frequently creates unfavorable conditions for receiving the encoded data, for such reasons as cross-coupling between lines, ground power voltage variations, noise spikes, electromagnetic radiation, and so on.

However, there are still security issues when sending information over a data bus that employs differential transmission. For instance, some host-client systems employ a "pay-per-use" business model in which the client hardware is sold at cost or even at a loss, and the source of income and profit is the revenue charged for applications, entertainment and other content downloaded on demand from the host to the client.

The host servers can be made reasonably secure, as they can be situated in a controlled physical environment. However, there are two distinct kinds of exposures for the valuable outgoing content sent from the host server to the client. Therefore, the ability to limit access to valuable data is desirable.

One security problem is the interception of a legitimately supplied content stream by an unauthorized third party. This is particularly a problem if such content is delivered over a public broadband Internet connection.

A second security problem is that out of the extremely large numbers of registered client systems, there may be some who appear genuine, but may download and pay for content with the express purpose of copying it for unauthorized use elsewhere. Such users may also be prepared to deliberately modify their client hardware in order to circumvent any content encryption, decryption or protection measures designed to prevent any such activity, especially if the financial rewards of such piracy are significant.

In response, some client systems employ encryption/decryption software to stop potential piracy by both client systems and unauthorized third parties. Software can be upgraded or fixed if its security function is compromised, and in addition can run more complex encryption/decryption algorithms.

However, the protection offered in conventional encryption/decryption software can be bypassed if it is running in memory attached to a processor by a bus, such as a differential transitional bus, that can be monitored. If this bus is monitored for signals transmitted across it, both the encrypted and unencrypted data can be read. Therefore, the data is not secure, as the unencrypted version of the data is accessible.

Therefore, there is a need for a method and an apparatus for encrypting data that is transmitted across a differential transitional data bus that overcomes the limitations of conventional systems.

SUMMARY

The present invention provides an encryption method and system for employment with a differential bus. The method comprises the step of dynamically encrypting a bus having transitional coding and an encoder and decryptor for mapping. The method comprises the steps of establishing a bus cycle. The method further comprises the steps of dynamically and pseudo-randomly changing a mapping function for a later bus cycle.

BRIEF DESCRIPTION OF THE DRAWINGS

For a more complete understanding of the present invention, and the advantages thereof, reference is now made to the following Detailed Description taken in conjunction with the accompanying drawings, in which:

FIG. 3 schematically illustrates a method flow diagram for employing encryption and decryption with differential transitional coding.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or a microprocessor executing firmware, or some combination thereof. In one embodiment, dedicated integrated logic circuits that are encoded to perform such functions are used. In other embodiments, functions are performed by a processor, such as a computer or an electronic data processor, in accordance with code, such as computer program code, software, and/or integrated circuits that are coded to perform such functions, unless indicated otherwise.

Figure 1:
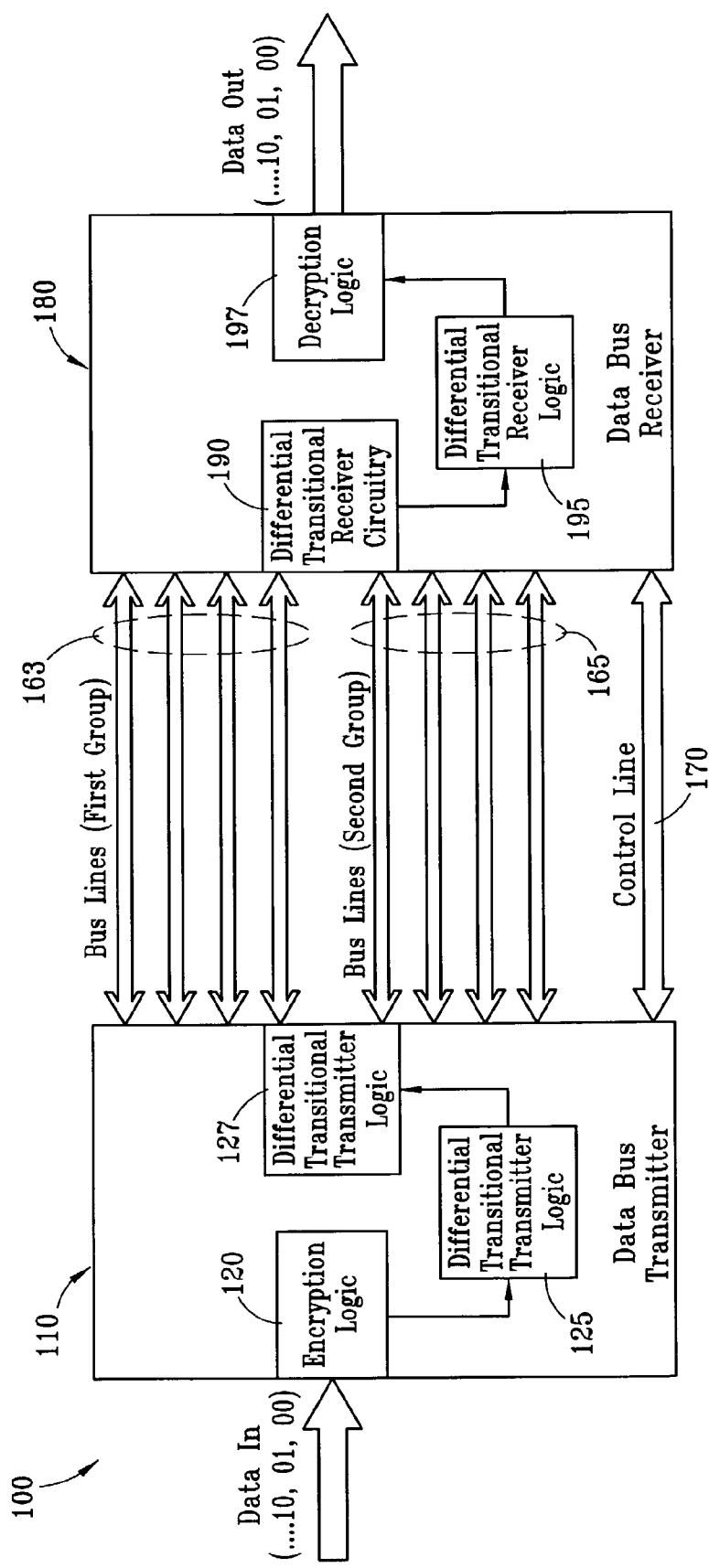
FIG. 1 schematically depicts a bus system adapted to employ an encrypted differential form of transitional coding.

Referring to FIG. 1, the reference numeral 100 generally designates a differential bus system that employs data bus encryption. The system 100 is adapted to receive input "data in" into a data bus transmitter 110. The data bus transmitter 110 comprises encryption logic 120, differential transitional transmitter logic 125, and differential transitional transmitter driver circuitry 127.

Generally, the encryption logic 120 of the data bus transmitter 110 employs circuitry to dynamically map 2-or-more bit binary packets in "data in" into a corresponding encrypted logic status of "A", "B", "C" or "D." The mapping of the potential "data in" values (that is "00", "01", "10" and "11") into its corresponding encrypted logic status of "A", "B", "C" or "D" typically varies from bus transfer cycle to bus transfer cycle.

For example, the "data in" value of "01" maps as the encrypted logic status of "A" in a first bus transfer cycle. However, the "data in" value "01" maps as the encrypted logic status of "D" in the second bus transfer cycle, and so on. In all, with a single group of four bus lines, there are a total of 24 separate mapping configuration schemes for a bus line group employing four bus lines.

Typically, the mapping circuitry of the encryption logic 120 dynamically employs the output of a pseudo-random number generator to determine the specific mapping of the given logic status of "A", "B", "C" or "D" value that is to be given to the two bits of "00", "01", "10" or "11" dynamically for a given bus transfer cycle. As is understood by those of skill in the art, a pseudo-random number generator generates a number or string of numbers by an arithmetic and/or a logical process. The generated numbers are not truly random, but the string of numbers is sufficiently long and non-repetitive as to emulate randomness for practical purposes.

In the system 100, the pseudo-random numbers are used by the encryption logic 120 for the mapping of the "data in" 2-bit binary packets to a particular mapping configuration. In other words, the pseudo-random numbers determine which of the 24 combinations of "data in" correlate to their separate logic status levels for the given bus transfer cycle.

For instance, in the first bus transfer cycle, a "data in" value of "00" maps to status "C", a "data in" value of "01" maps to status "A", a "data in" value "10" maps to status "D", and a "data in" value of "11" maps to status "B". In the next bus transfer cycle, a "data in" value of "00" maps to status "B", a "data in" value of "01" maps to status "D", a "data in" value "10" maps to status "C", a "data in" value of "11" maps to status "A", and so on. These mappings of specific "data in" binary packet values to a specific logic state is a function of the pseudo-random numbers generated by the encryption logic 120.

In the transmitter logic 125, the resulting logic status is then transformed into differential transitional code corresponding to the previous bus line group state. This differential transitional code is then implemented as the necessary transitions of the asserted and de-asserted bus lines by the driver 127. The driver 127 is coupled to a group of bus lines 163 and a group of bus lines 165, and differentially drives the voltages of the bus lines of these bus groups. Both groups of bus lines 163, 165 are coupled to a data bus receiver 180.

Typically, the bus lines are divided into one or more groups, the first bus line group 163 and, in a further embodiment, the second bus line group 165. Each of the bus line groups are functionally divided by the data bus transmitter 110 into two defined sets. The first set comprises the asserted bus lines (that is, bus lines with a "high" voltage), and a second set comprises de-asserted bus lines (that is, bus lines with a "low" voltage). Each set is defined as having an equal number of asserted and de-asserted elements, that is, an equal number of "ones" (members of the asserted set) and "zeroes" (members of the de-asserted set). An encoding rule employed by the system 100 is that there shall always be half the bus lines asserted and half de-asserted within the bus line groups 163, 165. The potential transitions of various bus lines, one transition of each set, correlate to specific logic status "A", "B", "C" or "D" transmissions.

Generally, the system 100 of FIG. 1 executes bus transfer cycles. Typically, a bus transfer cycle comprises the differential bus system 100 transitioning and asserting (that is, making the voltage higher) on one member of the set of bus lines which were previously de-asserted. A bus transfer cycle further comprises the system 100 de-asserting (that is, making the voltage lower) on one member of the set of bus lines which were previously asserted. In this manner, the logic status of "A", "B", "C" and "D" are transmitted to the data bus receiver 180. In a further embodiment, a bus line group comprises six bus lines. In a still further embodiment, the system 100 comprises a plurality of groups.

The data bus receiver 180 comprises differential transitional receiver circuitry 190, differential transitional receiver logic 195, and decryption logic 197. Generally, the receiver circuitry 190 receives the bus lines of a group. The receiver circuitry 190 compares the various bus lines of a group to one another to determine comparative bus line voltages, that is, which bus lines have a higher voltage than other lines. This information is then sent to the receiver logic 195. The receiver logic 195 then determines how sets of the bus line group 163 have transitioned from the preceding bus transfer cycle. A change from one bus line state to another yields a logic output status of "A", "B", "C" or "D", as it was originally sent by the driver 127. The logic status of "A", "B", "C" or "D" is then sent to the decryption logic 197.

The decryption logic 197 also has input into it, or otherwise deduces, the pseudo-random number sequence corresponding to the pseudo-random number that was employed by the encryption logic 120 to map the binary data to a logic status of A", "B", "C" or "D" for a given bus transfer cycle. Therefore, the decryption logic 197 selects the appropriate mapping circuitry from the 24 different mapping circuit configurations of any given bus line group transition. The select logic status is then decrypted by the selected mapping circuit of the mapping circuitry of the decryption logic 197. The appropriate two-bit binary packet, that is, "00", "01", "10" and "11", is then output as "data out".

In another aspect of the invention, the system 100 employs a plurality of bus line groups 163, 165 substantially in parallel. That is, a plurality of separate packets of encrypted data are differentially transmitted, substantially in parallel, from the data bus transmitter 110 to the data bus receiver 180. At least two members of the plurality of the group of bus lines 163, 165 encode a similar "data in" value as differing logic status values.

For instance, in the first bus transfer cycle, the bus line group 163 differentially transmits an encoded "data in" data packet "00" as logic status "C", but bus line group 165 differentially transmits an encoded "data in" data packet "00" as logic status "B". In the second bus transfer cycle, the bus line group 163 differentially transmits an encoded "data in" data packet "10" as logic status "B", but bus line group 165 differentially transmits an encoded "data in" data packet "11" also as logic status "B", and so on.

Generally, the encryption logic 120 and the decryption logic 197 makes it more difficult for an unauthorized party to determine the content of data that is transmitted over a data bus, such as a differential transitional data bus. Thus, although the entire sequence of bus line assertions and de-assertions is known by an unauthorized third party, deducing the likely actual data content from intercepted bus traffic becomes increasingly difficult. This difficulty increases further if the encoder mapping uses only a relatively short part of this sequence, chosen in a random or pseudo-random fashion, for a limited number of bus cycles.

Figure 2:
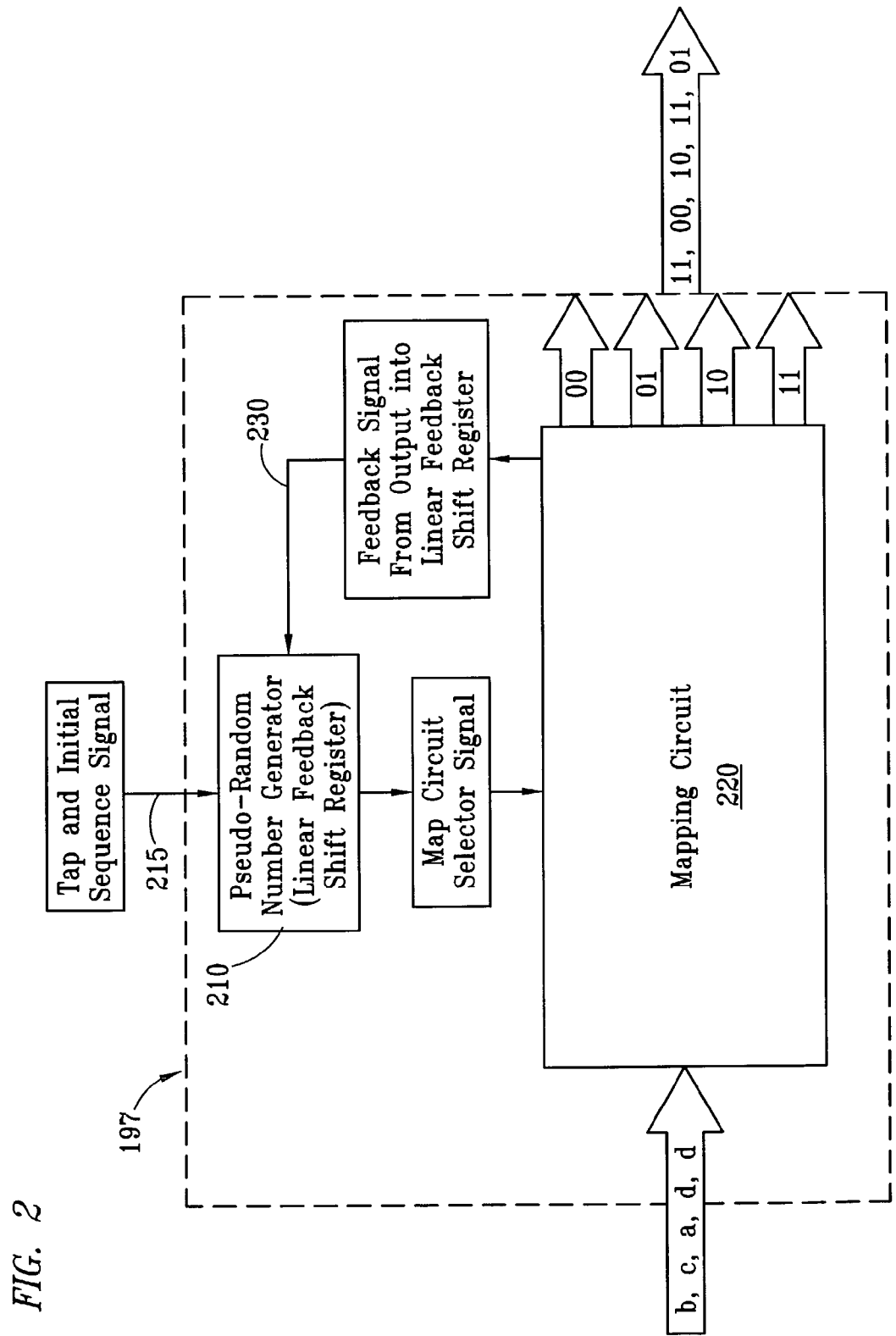
FIG. 2 schematically depicts a system-level diagram of a receiver which employs multiple mapping circuits to decrypt logic status levels transmitted by transitional differential coding.

Turning now to FIG. 2, depicted is a more detailed version of the decryption logic 197. Although only the decryption logic 197 is illustrated and described in detail, similar reasoning applies to the encryption logic 120. The decryption logic 197 comprises a pseudo-random number generator 210 and mapping circuitry 220. The generator 210 is coupled to a tap and initial sequence signal 215. The generator 210 is functionally coupled to the mapping circuitry 220 through the map circuit selector signal 240. In one embodiment, the generator 210 receives output from the mapping circuitry 220 through the feedback signal 230.

The decryption logic 197 receives status logic from the receiver logic 195. The decryption logic 197 also receives "tap" values for employment with the pseudo-random number generator, such as a Linear Feedback Shift Register, through the signal line 215. Those of skill in the art understand the employment of linear feedback shift registers for generation of pseudo-random numbers. In another embodiment, the tap values are already embedded within the generator 210.

The generator 210 also receives, or has programmed within its hardware or software, a key value, also known as an "initial fill" or "initial vector", which when employed with the tap values, creates the pseudo-random numbers employed by the mapping circuitry 220. Typically, the pseudo-random numbers are calculated and input into the mapping circuitry 220 for each bus transfer cycle.

The mapping circuitry 220 employs the pseudo-random numbers to determine which specific map function, and therefore which map circuit, should be used to decrypt the encrypted status logic as input by the receiver logic 195. The encryption logic 120 and the decryption logic 197 calculate the same, or logically related, pseudo-random numbers per bus transfer cycle. Therefore, both the encryption logic 120 and the decryption logic 197 are employable to encrypt and decrypt the same packet of binary numbers to extract from "data in" to place in "data out".

For instance, if in the first bus transfer cycle, the encryption logic 120 encrypts the "data in" data packet "01" as logic status "C", when the logic status "C" is decrypted by the decryption logic 197, it is decrypted as a "data out" data packet "01". If in the second bus transfer cycle, the encryption logic 120 encrypts the "data in" data packet "10" as logic status "A", when the logic status "A" is decrypted by the decryption logic 197, it is also decrypted as a "data out" data packet "10", and so on.

In another aspect of the present invention, the decrypted "data out" data packets are also input into the generator 230 through the feedback signal 230. The "data out" binary value is employable to altering the initial vector, the tap values, or both. The "data in" data packet values are also therefore employed to alter the initial vector, the tap values, or both by the encryption logic 120. Because the value of the "data out" decrypted data packets (that is, "00", "01" and so on) deduced by the decryption logic 197 is also known to the encryption logic 120, both the decryption logic 197 and the encryption logic 120 alter their initial vectors and/or tap values in the same manner. Therefore, the pseudo-random numbers generated by the encryption logic 120 to encrypt data for a given bus transfer cycle correspond to the pseudo-random numbers generated by the decryption logic 197 for decrypting and mapping from the logic status to "data out" binary data for that bus transfer cycle. The pseudo-random numbers generated comprise a function of the data in itself, thereby increasing the difficulty of breaking the encryption.

In another aspect of the present invention, the tap and/or initial vector values themselves are changed in a manner known to both the encryption logic 120 and the decryption logic 190. This enables the encryption and decryption itself to be deterministically changed, thereby increasing security of the system 100.

Turning now to FIG. 3, disclosed is a method 300 for encrypting binary data packets as "data in" and decrypting the binary data packets as "data out". In a further aspect of the method 300, parallel transmission and reception of indicia corresponding to a plurality of encoded encrypted status logic levels generally occurs substantially simultaneously, and will not be discussed further. However, those of skill in the art understand that parallel transmission of encrypted logic status levels is within the scope of the present invention.

In step 305, bus transfer cycles are established. In other words, the system 100 generally initiates bus transfer cycles. In step 310, the method 300 receives binary data packets from "data in". The step 310 also establishes a bus transfer cycle. In the method 300, these packets are in the form of "00", "01", "10", "11". However, for a six-wire line group, the binary data packets "000", "001", "010", "011", and so on, are received.

In step 320, pseudo-random numbers are generated within the encryption logic 120. The pseudo-random numbers are generated by a linear feedback shift register, although other pseudo-random number generators are within the scope of the present invention. A logic status, status "A", "B", "C" or "D" is encrypted as a function of the pseudo-random number and the received binary data packet. The encrypted logic status is associated with the first bus line group 163.

In step 330, the transmitter logic 125 determines the bus lines to be asserted and de-asserted. The asserted and de-asserted bus lines are indicative of their corresponding encrypted logic status levels. These status levels either change or do not change from bus transfer cycle to the next. However, every transmission of an encrypted logic status will assert and de-assert different bus lines, even if the encrypted status does not change between two consecutive bus transfer cycles.

In step 340, the encrypted logic status levels transitions are differentially coded and transmitted from the data bus transmitter 110 to the data bus receiver 180.

In step 350, the encoded encrypted logic status levels transitions are differentially received by the receiver circuitry 190 of the data bus receiver 180, from the data bus transmitter 110. In step 350, the voltages of the individual wires of the bus line group 163 are then compared to one another by the receiver circuitry 190. Then, the receiver logic 195 determines how the voltage comparisons have changed from one bus transfer cycle to the next bus transfer cycle. The comparison of the bus line voltage level transitions from the previous bus cycle to the next bus cycle is then interpreted and re-created as the encrypted status logic levels "A", "B", "C" and "D" and transmitted by the data bus transmitter 110.

In step 360, the decryption logic 197 generates a pseudo-random number that is correlated to the pseudo-random number generated in step 320. The pseudo-random number generated by step 360 enables the decryption logic 197 to map the encrypted status logic level "A", "B", "C" or "D" as a decrypted two-bit binary character "00", "01", and so on. In step 380, the decrypted logic status information, that is "00", "01" and so on, is transmitted as "data out". In step 385, the method 300 determines whether to stop if there is no more data to be encrypted and differentially transmitted. If no more data is to be encrypted and differentially transmitted, step 390 executes. If more data is to be encrypted and differentially encrypted, the method 300 re-executes step 310.

It is understood that the present invention can take many forms and embodiments. Accordingly, several variations may be made in the foregoing without departing from the spirit or the scope of the invention. Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of embodiments. Accordingly, it is appropriate that the appended claims be construed broadly and in a manner consistent with the scope of the invention.

The invention claimed is:

1. A method for dynamically encrypting a data bus, comprising:

receiving, by a data bus transmitter coupled to a data bus, a first input data packet;

mapping the first input data packet to a corresponding one of a plurality of different encrypted logic status values dependent upon a selected pseudo-random number in accordance with a selected mapping function and a selected bus cycle, to generate a first encrypted data packet;

wherein the selected mapping function employs differential transitional encoding based on the selected pseudo-random number;

wherein the selected pseudo-random number is associated with the selected bus cycle, from a plurality of pseudo-random numbers and a plurality of bus cycles; and transmitting the first encrypted data packet to a data bus receiver coupled to the data bus.

2. The method of claim 1, wherein the selected mapping function is selected from a plurality of mapping functions comprising at least twenty-four mapping functions, each mapping function associated with a selected bus cycle.

3. The method of claim 1, further comprising:
receiving a second input data packet; and
mapping the second input data packet to a corresponding one of the plurality of different encrypted logic status values dependent upon a selected pseudo-random number in accordance with a different selected mapping function and a different selected bus cycle than the selected mapping function and selected bus cycle employed in the mapping of the first input data packet, to generate a second encrypted data packet.

4. The method of claim 1, wherein the selected bus cycle is selected as a function of the first encrypted data packet.

5. The method of claim 1, wherein the selected bus cycle comprises a plurality of synchronous bus transfer cycles.

6. The method of claim 5, wherein at least two of the plurality of synchronous bus transfer cycles employ differing selected mapping functions.

7. The method of claim 1, further comprising:
receiving, by the data bus receiver, the first encrypted data packet;
determining the selected bus cycle;
determining the selected pseudo-random number based on the selected bus cycle;
determining the selected mapping function based on the selected pseudo-random number;
and
decoding the first encrypted data packet based on the selected mapping function.

8. The method of claim 7, wherein the step of determining the selected bus cycle comprises receiving indicia of the selected bus cycle.

9. A system, comprising:
a data bus;
a data bus transmitter coupled to the data bus and configured to receive a first input data packet;
the data bus transmitter further configured to select a selected bus cycle from a plurality of bus cycles and to select a selected pseudo-random number from a plurality of pseudo-random numbers;
wherein the data bus transmitter is further configured to map the first input data packet to a corresponding one of a plurality of different encrypted logic status values in accordance with a selected mapping function, to generate a first encrypted data packet;
wherein the selected mapping function is selected from a plurality of mapping functions based on the selected bus cycle and the selected pseudo-random number;
the data bus transmitter further configured to encode the first encrypted data packet in a differential transitional encoding, to generate a first encoded data packet; and
the data bus transmitter further configured to transmit the first encoded data packet to a data bus receiver coupled to the data bus.

10. The system of claim 9, wherein the selected pseudo-random number is created by a linear feedback shift register.

11. The system of claim 9, wherein the data bus transmitter is further configured to change the selected bus cycle at each one of a plurality of clock cycles.

12. The system of claim 9, further comprising a bus line group, comprising four bus lines, coupled to both the data bus transmitter and the data bus receiver.

13. The system of claim 9, further comprising a bus line group, comprising six bus lines, coupled to both the data bus transmitter and the data bus receiver.

14. The system of claim 9, wherein the data bus transmitter and the data bus receiver are configured to establish a plurality of temporally synchronous selected bus transfer cycles.

15. The system of claim 14, wherein at least two selected bus cycles of the plurality of temporally synchronous selected bus cycles each employ a different mapping function.

16. The system of claim 9, wherein the data bus receiver is configured to:
receive the first encoded data packet;
determine the selected bus cycle;
determine the selected pseudo-random number based on the selected bus cycle;
determine the selected mapping function based on the selected pseudo-random number; and
decode the first encoded data packet based on the selected mapping function.

17. A computer program product for dynamically encrypting a data bus, the computer program product having a medium with a computer program embodied thereon, the computer program comprising:
computer code for receiving, by a data bus transmitter coupled to a data bus, a first input data packet;
computer code for mapping the first input data packet to a corresponding one of a plurality of different encrypted logic status values dependent upon a selected pseudo-random number in accordance with a selected mapping function and a selected bus cycle, to generate a first encrypted data packet;
wherein the selected mapping function employs differential transitional encoding based on the selected pseudo-random number;
wherein the selected pseudo-random number is associated with the selected bus cycle, from a plurality of pseudo-random numbers and a plurality of bus cycles; and
computer code for transmitting the first encrypted data packet to a data bus receiver coupled to the data bus.

18. The computer program product of claim 17, further comprising:
computer code for receiving, by the data bus receiver, the first encrypted data packet;
computer code for determining the selected bus cycle;
computer code for determining the selected pseudo-random number based on the selected bus cycle;
computer code for determining the selected mapping function based on the selected pseudo-random number; and
computer code for decoding the first encrypted data packet based on the selected mapping function.

19. A processor for dynamically encrypting a data bus, the processor including a computer program comprising:
computer code for receiving, by a data bus transmitter coupled to a data bus, a first input data packet;
computer code for mapping the first input data packet to a corresponding one of a plurality of different encrypted logic status values dependent upon a selected pseudo-random number in accordance with a selected mapping function and a selected bus cycle, to generate a first encrypted data packet;
wherein the selected mapping function employs differential transitional encoding based on the selected pseudo-random number;
wherein the selected pseudo-random number is associated with the selected bus cycle, from a plurality of pseudo-random numbers and a plurality of bus cycles; and computer code for transmitting the first encrypted data packet to a data bus receiver coupled to the data bus.

20. The processor of claim 19, further comprising:

computer code for receiving, by the data bus receiver, the first encrypted data packet;

computer code for determining the selected bus cycle;

computer code for determining the selected pseudo-random number based on the selected bus cycle;

computer code for determining the selected mapping function based on the selected pseudo-random number; and computer code for decoding the first encrypted data packet based on the selected mapping function.

* * * * *